3,215,704
PROCESS FOR PREPARING 3-SUBSTITUTED
2-THIAZOLIDINETHIONES
Robert Chalk Kinstler, Bridgewater Township, Somerset County, N.J., assignor to American Cyanamid Company, Stamford, Conn., a corporation of Maine
No Drawing. Filed Nov. 18, 1963, Ser. No. 324,221
10 Claims. (Cl. 260—306.7)

The present invention is concerned with an improved method for the manufacure of accelerators for use in vulcanization of chlorine-containing synthetic elastomers.

In general, the accelerators of this invention may be defined as 2-thiazolidinethiones of the structural Formulae I and II:

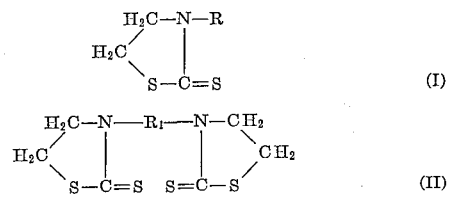

wherein R is lower alkyl, lower alkenyl, 5- or 6-membered cycloakyl, monocyclic or bicyclic or (lower alkyl), furfuryl, morpholinomethyl and wherein $R_1$ is lower alkylene or cyclohexylene. As such, compounds of this invention and their use is shown in the copending application, Serial No. 176,435, filed February 28, 1962; by F. A. V. Sullivan and A. C. Lindaw assigned to a common assignee.

Chlorine-containing synthetic elastomers, for which these compounds are used as accelerators, include a number of different commercially-available types. Polychloroprene polymers represent one such. As used herein, the term "Polychloroprene" includes not only polymers of chloroprene (2-chloro-1,3-butadiene), but also copolymers thereof with polymerizable vinyl or diene compounds wherein choloroprene is the predominant monomer. Other types of chlorine-containing elastomers for which these compounds find use in vulcanization include, for example, chlorinated butyl rubber, polymers of chlorinated and/or chlorosulfonated polyethylene, copolymers of ethyl acrylate with vinyl chloroacetate, copolymers of ethyl acrylate with 2-chloro-ethyl vinyl ether, and the like.

As shown in the above-noted application, the accelerators of the present invention may be formed by several methods. Perhaps the best, and that which has been most commonly used, is shown by Batty et al., J. Chem. Soc. 1949, 786. In that procedure, about one mole of an N-substituted beta-aminoethanol is added to about two moles of carbon disulfide and the mixture is reacted under high pressure presumably according to the reaction:

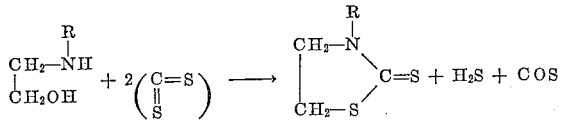

Yields as high as 65–75% of theory have been reported for laboratory preparations.

Unfortunately, in a commercial-scale operation, the products are found to be impure mixtures contaminated with large amounts of colored and odoriferous by-products. Crystallization from organic solvents is required before the products can be marketed for use as accelerators. Depending upon the value of "R," yields of purified products range much lower, in some cases as low as 20% of theory.

An improvement in the process is disclosed in the copending application, Serial No. 264,037, filed March 11, 1963, and now abandoned, by F. H. Adams and also assigned to a common assignee. Therein, the reaction is carried out in a solvent. Yields of relatively pure products are obtained, ranging up to some 70% of theory. However, use of the solvent introduces economic, safety and handling factors which are undesirable if they can be avoided.

It is, therefore, the principal object of this invention to provide a useful process for the manufacture of these compounds without necessity for the use of organic solvent media and purification of the product before shipping and/or use. Such a procedure will fill a distinct, existing need in this field. This object has been fulfilled to an unexpected degree in the process of the present invention.

In general, the process of this invention is based on the discovery that, by reacting one mole of the N-substituted-2-ethanolamine directly with about 2 moles of carbon disulfide under the correct and properly controlled conditions, it is possible to obtain very good yields of the 2-thiazolidinethiones of Formulae I and II. Such products have a surprisingly high degree of purity. They do not require further purification for use as vulcanization accelerators.

The process also offers the advantages of operating without a solvent, and, without the problems of solvent recovery, in simple and readily available equipment at atmospheric pressure and moderate temperatures. Additionally, omission of a solvent medium permits the production of larger batches in a given piece of equipment.

According to the improved process of this invention, carbon disulfide is added in two stages to about one mole part of the N-substituted 2-ethanolamine at temperatures in the range between about 50° C. and about 160° C. Reaction is carried out in a stirred vessel at atmospheric pressure. No solvent is used.

The carbon disulfide must be added below the surface of the reaction mixture. This is done in two stages. Temperature must be controlled very carefully in both stages of the reaction.

During addition of the first half mole part of carbon disulfide, strongly exothermic reaction occurs. During this stage, the temperature range should be from about 50° C. to about 100° C., preferably below about 75° C. Cooling is ordinarily required to prevent exceeding these limits. Later, in the second stage, as considerable volumes of gas are evolved, the mixture may require heating to maintain a suitable temperature level above about 110° C., preferably above about 120° C. This has been found best for efficient absorption of carbon disulfide.

During addition of the last three-quarters of the carbon disulfide, by-product gas consisting of hydrogen sulfide and carbonyl sulfide is evolved. Initially, this occurs very rapidly. However, toward the end of the reaction period, the rate of gas evolution falls off very markedly. Carbon disulfide begins to condense out of the by-product gas mixture as the latter is cooled to 25–30° C., as is done in the normal course of operation. At this point, addition of carbon disulfide is terminated. The total carbon disulfide required to be fed usually is about 2.1 to about 2.5 moles, depending on the efficiency of dispersion of the carbon disulfide vapor in the reaction mixture. When the latter is added as a very fine dispersion of vapor in a sufficiently vigorously agitated reaction vessel, very little more than about the 2.0 moles of theory will be required. This condition is difficult to maintain in industrial-scale operations.

At this stage, the reaction product is in molten condition and is stripped of excess carbon disulfide and dissolved gases. This may be done, for example, by applying a vacuum to the reaction vessel or by stripping with an inert gas such as nitrogen. One convenient method is to strip the melt at 100–125° C. with steam, then evacuate the reaction vessel to about 20–40 mm. of mercury (absolute) to dehydrate the batch.

Resultant products are recovered in unexpectedly high yields of from about 96% to almost 100%. The recovered products, without any additional purification, melt at temperatures within 3–5° C., of the melting point of the pure compounds. In this state they are suitable for direct use as vulcanization accelerators for the above-noted polychloroprene and other chlorine-bearing elastomers.

Suitable N-substituted 2-ethanolamines for use in the process of this invention include, for example, N-methyl-, N-ethyl-, N-(beta-chloroethyl)-, N-(beta-hydroxyethyl)-, N-(beta-methoxyethyl)-, N-n-butyl, N-isobutyl, N-cyclohexyl-, N-allyl-, N-benzyl-, N-(p-methylbenzyl)-, N-(p-methoxybenzyl)-, N-(p-chlorobenzyl)-, N-(1-napthylmethyl)-, N-(2-naphthylmethyl)-, N-(beta-phenylethyl)-, N-2-furfuryl-, N-morpholinomethyl-2-ethanolamine, N-N'-ethylene-bis(2-ethanolamine), N,N'-trimethylene-bis-(2-ethanolamine) and N,N'-hexamethylene-bis-(2-ethanolamine).

The invention will be further discussed in conjunction with the following examples which are intended as illustrative. Therein, unless otherwise noted, all parts and percentages are by weight and temperatures are in degrees Centigrade.

EXAMPLE 1

A jacketed reaction vessel equipped with an efficient stirrer, a gas dispersion tube leading to the bottom of the vessel, a water-cooled reflux condenser and a gas outlet from the condenser through a vapor trap cooled to −60° C., is employed. To the vessel is charged 571 parts (7.6 moles) of N-methyl-2-ethanolamine to which, over a period of approximately one hour, 240 parts (3.2 moles) of carbon disulfide is added through the dispersion tube while keeping the temperature of the reaction mixture below about 75° C. The reaction mixture is then heated to about 125° C. and additional carbon disulfide is introduced. Addition of carbon disulfide is continued at a rate of 200–250 parts per hour for about 5½ hours until refluxing is observed in the water-cooled condenser. The temperature of the reaction mixture is increased to 135–138° C. during the last hour of addition. A total of 1380 parts of carbon disulfide is added to the reaction vessel, of which 213 parts is recovered from the vapor trap, indicating a net consumption of carbon disulfide of about 1167 parts (or 15.3 moles). Hydrogen sulfide and carbonyl sulfide gases are expelled from the reaction mixture by passing nitrogen through the gas dispersion tube. The reaction mixture is crystallized by being poured onto a cool surface. The flaked product, 3-methyl-2-thiazolidinethione, (recovered by scraping it from the surface), melts at 65°–67° C. and amounts to about 1,014 parts (equivalent to 7.6 moles). This compares favorably with pure 3-methyl-2-thiazolidinethione which melts at 70.1° C.

EXAMPLE 2

To the equipment used in Example 1, 357 parts (4.0 moles) of N-ethyl-2-ethanolamine is charged followed by the introduction of 126 parts of carbon disulfide, while cooling to maintain a temperature below 70° C. Addition of carbon disulfide is then continued for five hours at a temperature of 130°–132° C. until the mixture is in vigorous reflux. A total of 935 parts of carbon disulfide is added with 291 parts being recovered from the vapor trap, indicating a net consumption of 644 parts (8.45 moles). After removing hydrogen sulfide and carbonyl sulfide by flushing with nitrogen at 110–120° C., the product is cooled to 20° C. and the resulting oil weighed. The 3-ethyl-2-thiazolidinethione so obtained amounts to 562 parts (3.85 moles) and its setting point is 9.0° C. This compares favorably with pure 3-ethyl-2-thiazolidinethione which has a setting point of about 13.0° C.

EXAMPLE 3

The procedure of Example 2 is followed, using 453 parts (3.00 moles) of N-benzyl-2-ethanolamine and a net usage of 517 parts (6.7 moles) of carbon disulfide. The product weighs 594 parts corresponding to 2.84 moles of 3-benzyl-2-thiazolidinethione. This product is a crystalline material melting at 119.5–127.0° C. Recrystallization from ethanol produces pure white crystals melting at 132.0°–132.2° C.

EXAMPLE 4

To the reaction vessel used in Example 1, is charged 571 parts (7.6 moles) of N-methyl-2-ethanolamine. Carbon disulfide addition is initiated through the gas dispersion tube. As the first three moles of carbon disulfide are added, the temperature of the reaction mixture rises to 115° C. Heat is applied to bring the temperature to 125–127° C. and carbon disulfide addition is continued until the mixture is refluxing vigorously. A total of 1650 parts of carbon disulfide is introduced, 360 parts being recovered from the vapor trap, leaving a net usage of 1290 parts (16.9 moles). Hydrogen sulfide and carbonyl sulfide are removed by adding water at the rate of 3–4 parts per minute below the surface of the reaction mixture at a temperature of 104°–110° C. After applying a vacuum to remove moisture, the reaction mixture is cooled. The product yield is a light tan crystalline solid melting at 62.7°–66.5° C., comparing favorably with the product of Example 1 and with the pure product which melts at 70.1° C.

EXAMPLES 5–16

The procedure of Example 1 is followed, substituting for the N-methyl-2-ethanolamine an equivalent amount of the N-substituted 2-ethanolamine shown in column 2 of Table I. Products obtained are shown in column 3 of Table I.

*Table I*

| Example No. | 2-Ethanolamine | 2-Thiazolidinethione |
|---|---|---|
| 5 | N-(beta-hydroxyethyl)- | 3-(beta-hydroxyethyl)- |
| 6 | N-(beta-methoxyethyl)- | 3-(beta-methoxyethyl)- |
| 7 | N-(beta-chloroethyl)- | 3-(beta-chloroethyl)- |
| 8 | N-isobutyl- | 3-isobutyl- |
| 9 | N-(beta-phenylethyl)- | 3-(beta-phenylethyl)- |
| 10 | N-(2-furfuryl)- | 3-(2-furfuryl)- |
| 11 | N-cyclohexyl- | 3-cyclohexyl- |
| 12 | N-allyl- | 3-allyl- |
| 13 | N-(p-methylbenzyl)- | 3-(p-methylbenzyl)- |
| 14 | N-(p-chlorobenzyl)- | 3-(p-chlorobenzyl)- |
| 15 | N-(1-naphthylmethyl)- | 3-(1-naphthylmethyl)- |
| 16 | N-(2-naphthylmethyl)- | 3-(2-naphthylmethyl)- |

EXAMPLES 17–19

The procedure of Example 1 is followed, substituting for the N-methyl-2-ethanolamine, an equivalent amount of the N,N'-alkylene-bis-(2-ethanolamine) shown in Table II. The products are shown in column 3 of Table II.

*Table II*

| Example No. | 2-Ethanolamine | 2-Thiazolidinethione |
|---|---|---|
| 17 | N,N'-ethylene-bis- | 3,3'-ethylene-bis- |
| 18 | N,N'-trimethylene-bis- | 3,3'-trimethylene-bis- |
| 19 | N,N'-hexamethylene-bis- | 3,3'-hexamethylene-bis- |

I claim:

1. In the preparation of a 3-substituted-2-thiazolidinethione selected from the group consisting of those of Formulae I and II as follows:

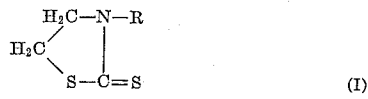

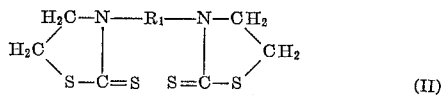

and wherein R is a member selected from the group consisting of lower alkyl, lower alkenyl, 5-membered cycloalkyl, 6-membered cycloalkyl, lower mono- and bicyclic aralkyl, furfuryl and morpholinomethyl; and $R_1$ is a member selected from the group consisting of lower alkylene and cyclohexylene;

by reacting an N-substituted-2-ethanolamine with carbon disulfide;

the improved two-stage process which comprises in the first stage:

introducing the entire amount of N-substituted-2-ethanolamine to a stirred vessel vented through a reflux condenser, maintaining a temperature above about 50° C., but below about 100° C., and introducing a stream of finely dispersed carbon disulfide below the surface of said ethanolamine;

maintaining the reaction mass at a temperature below about 100° C., while continuing the introduction of carbon disulfide until about 20 to about 30 percent of the total carbon disulfide has been added; then in the second stage:

raising the temperature of the reaction mass to above about 110° C., but below about 160° C.;

continuing the addition of the major portion of the carbon disulfide until liquid carbon disulfide condenses in the reflux condenser;

removing from the reacted mass any unreacted carbon disulfide and dissolved by-product gases; and cooling the residual mass to ambient room temperature; whereby said 3-substituted-2-thiazolidinethione is obtained in high yield and in quality sufficiently high, without further purification, for use in compounding and vulcanizing chlorine-containing elastomers.

2. A process according to claim 1 in which in said first stage, carbon disulfide is introduced while maintaining the reaction mass at a temperature below about 75° C.

3. A process according to claim 1 in which in said first stage, carbon disulfide comprises about one-half mole part per mole part of N-substituted-2-ethanolamine.

4. A process according to claim 1 in which the carbon disulfide is added in said second stage at a temperature above about 120° C.

5. A process according to claim 1 in which said dissolved gases are removed from the hot reaction mixture by flushing with nitrogen.

6. A process according to claim 1 in which said dissolved gas is removed by steam distillation followed by application of vacuum to the residual mass.

7. A process according to claim 1 in which from about 2.0 to about 2.5 mole parts of carbon disulfide is added per mole part of N-substituted -2-ethanolamine.

8. A process according to claim 1 in which the ethanolamine is N-methyl-2-ethanolamine.

9. A process according to claim 1 in which the ethanolamine is N-ethyl-2-ethanolamine.

10. A process according to claim 1 in which the ethanolamine is N-benzyl-2-ethanolamine.

No references cited.

NICHOLAS S. RIZZO, *Primary Examiner.*